(12) United States Patent
Oyama (10) Patent No.: US 10,427,896 B2
(45) Date of Patent: Oct. 1, 2019

(54) IMAGE FORMING APPARATUS

(71) Applicant: Brother Kogyo Kabushiki Kaisha, Nagoya (JP)

(72) Inventor: Yoshihiro Oyama, Tokai (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/910,075

(22) Filed: Mar. 2, 2018

(65) Prior Publication Data

US 2018/0257883 A1 Sep. 13, 2018

(30) Foreign Application Priority Data

Mar. 8, 2017 (JP) .................................. 2017-044154

(51) Int. Cl.
*G03G 21/16* (2006.01)
*H04N 1/00* (2006.01)
*B65H 3/06* (2006.01)

(52) U.S. Cl.
CPC ....... *B65H 3/0653* (2013.01); *G03G 21/1628* (2013.01); *G03G 21/1633* (2013.01); *H04N 1/00554* (2013.01); *B65H 2402/64* (2013.01); *B65H 2405/121* (2013.01); *G03G 21/1647* (2013.01); *H04N 1/0066* (2013.01); *H04N 1/00551* (2013.01); *H04N 2201/0063* (2013.01)

(58) Field of Classification Search
CPC ........... H04N 1/00554; H04N 1/00551; G03G 21/1628; G03G 21/1633; G03G 21/1638; G03G 21/1647; G03G 2221/1654; G03G 2221/1687; B65H 2402/64; B65H 2405/121; B65H 2405/115
See application file for complete search history.

(56) References Cited

U.S. PATENT DOCUMENTS

| 8,233,161 B2* | 7/2012 | Saito | G03G 15/605 |
| | | | 358/1.1 |
| 8,237,995 B2* | 8/2012 | Yamazaki | H04N 1/00543 |
| | | | 16/327 |
| 8,610,910 B2* | 12/2013 | Nishikawa | H04N 1/00519 |
| | | | 358/1.13 |
| 8,654,407 B2* | 2/2014 | Yamazaki | H04N 1/00543 |
| | | | 16/327 |

(Continued)

FOREIGN PATENT DOCUMENTS

| JP | H09-200400 A | 7/1997 |
| JP | H11-084983 A | 3/1999 |

(Continued)

*Primary Examiner* — Luis A Gonzalez
(74) *Attorney, Agent, or Firm* — Burr & Brown, PLLC (57) ABSTRACT

An image forming apparatus includes a first casing, a pivotable second casing, a pivotable document cover, and a lock mechanism including a movable hook and a fixed hook. The second casing has a document support surface. When the second casing is at a first position in which the second casing covers an upper surface of the first casing, and the document cover is at a fourth position in which the document cover reveals the document support surface, the movable hook is engaged with the fixed hook. When the second casing is at the first position, and the document cover is at a third position in which the document cover covers the document support surface, the movable hook is disengaged from the fixed hook.

7 Claims, 8 Drawing Sheets

(56) References Cited

U.S. PATENT DOCUMENTS

| | | | |
|---|---|---|---|
| 8,837,988 B1 * | 9/2014 | Hara | ................. B41J 29/54 |
| | | | 399/125 |
| 8,934,814 B2 * | 1/2015 | Wu | ................. B41J 29/13 |
| | | | 347/108 |
| 9,191,533 B2 * | 11/2015 | Nishikawa | ......... H04N 1/00519 |
| 9,456,097 B2 * | 9/2016 | Jo | ................. G03G 15/605 |
| 2011/0242626 A1 | 10/2011 | Nagashima | |
| 2014/0355084 A1 | 12/2014 | Inada et al. | |

FOREIGN PATENT DOCUMENTS

| | | | |
|---|---|---|---|
| JP | 2003-042457 A | | 2/2003 |
| JP | 2008109366 A | * | 5/2008 |
| JP | 2009-092828 A | | 4/2009 |
| JP | 2014-157367 A | | 8/2014 |
| JP | 2014-235214 A | | 12/2014 |

* cited by examiner

IMAGE FORMING APPARATUS

CROSS-REFERENCE TO RELATED APPLICATION

This application claims priority from Japanese Patent Application No. 2017-044154 filed on Mar. 8, 2017, the content of which is incorporated herein by reference in its entirety.

FIELD OF DISCLOSURE

The disclosure relates to an image forming apparatus including an image scanner.

BACKGROUND

A known image forming apparatus may include an image forming unit and an image scanner. The image scanner is disposed above the image forming unit. For example, an image forming apparatus includes a first casing that houses an image forming unit, and a second casing that houses an image scanner. The second casing is disposed above the first casing. A sheet discharge opening may be between the first casing and the second casing. The image forming apparatus further includes a document cover disposed above the second casing. A first hinge connects the first casing with the second casing. A second hinge connects the second casing with the document cover. The second casing is configured to open or pivot upward, relative to the first casing about the first hinge. The document cover is configured to open or pivot upward, relative to the second casing about the second hinge.

While the second casing is open, a user of the image forming apparatus may further open the document cover. This may cause the document cover to undesirably tip backwards away from the user due to weight imbalance, e.g., the center of gravity of the image forming apparatus shifted backwards. In particular, in a case that the document cover includes an automatic document feeder ("ADF"), the document cover is relatively heavy in weight. If the user opens such heavy document cover while the second casing is open, the image forming apparatus (e.g., the first casing) is more likely to tip backward.

For example, JP-A 2014-235214 discloses an image forming apparatus including a lock mechanism that holds a second casing relative to a first casing when a document cover is open.

SUMMARY

Some clearances are generally provided for a hinge (e.g., the second hinge) that connects the second casing and the document cover, to enable the document cover to readily open and close. The clearances may cause the document cover to be closed at different positions relative to the second casing every time the document cover is closed. This may cause the document cover to appear to be loose. If the document cover includes the ADF, the clearances may cause document feeding and scanning defects. For example, when the document cover is closed, the ADF is positioned relative to an image scanner disposed in the second casing. The position of the ADF relative to the image scanner may differ every time the document cover is closed due to the clearance for the hinge. The change in the position of the ADF may cause documents to be fed slantingly relative to the image scanner, resulting in a tilted scanned image.

For example, the image forming apparatus, as disclosed in JP-A 2014-235214, may include a positioning mechanism having a column and a recess, to properly position the document cover relative to the second casing. The positioning mechanism may hold the document cover, when closed, in proper position relative to the second casing. Providing the positioning mechanism and the lock mechanism, each at a different position, may lead to increase in sizes of the second casing and the document cover.

Examples of the present disclosure provide an image forming apparatus including an image scanner and a lock mechanism. The image forming apparatus may need reduced space, improve appearance, and enable the lock mechanism to operate reliably.

According to one or more aspects of the disclosure, an image forming apparatus includes an image forming unit, a first casing that houses the image forming unit therein, a second casing, a document cover, and a lock mechanism. The second casing includes a document support surface located at an upper surface of the second casing, and a positioning column protruding upward relative to the document support surface. The second casing is connected to the first casing, disposed above the first casing, and configured to pivot between a first position in which the second casing covers an upper surface of the first casing, and a second position in which the second casing reveals the upper surface of the first casing. The document cover is connected to the second casing, disposed above the second casing, and configured to pivot between a third position in which the document cover covers the document support surface, and a fourth position in which the document cover reveals the document support surface. The document cover has a positioning recess, in which the positioning column of the second casing fits when the document cover is at the third position. The lock mechanism includes a fixed hook disposed at the first casing, a movable hook disposed in the second casing, a pressed portion configured to move in association with the movable hook, and an actuator disposed in the positioning recess. The positioning column has a cutout portion configured to receive the pressed portion. When the second casing is at the first position and the document cover is at the fourth position, the pressed portion is located in the cutout portion and the movable hook is engaged with the fixed hook. When the second casing is at the first position and the document cover is at the third position, the positioning column fits in the positioning recess, and the actuator contacts the pressed portion, thereby disengaging the movable hook from the fixed hook.

DETAILED DESCRIPTION

An image forming apparatus according to one or more aspects of the disclosure will be described with reference to the accompanying drawings. In the following description, directional terms "front", "rear", "top/upper", "bottom/lower", "right", and "left" are used to define the various parts when the image forming apparatus is disposed in an orientation in which it is intended to be used.

[Configuration of Image Forming Apparatus]

Figure 1:
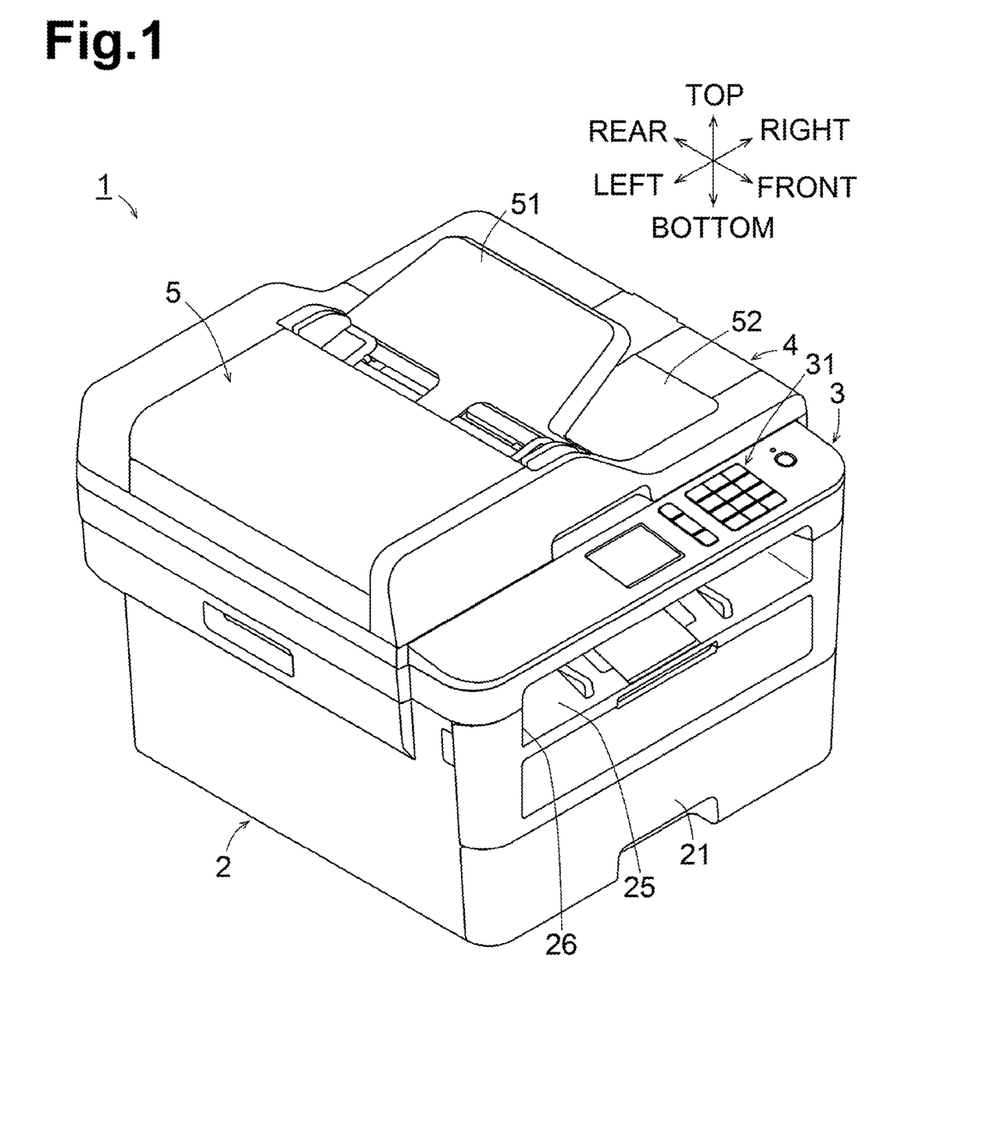
FIG. 1 is a perspective view of an image forming apparatus in an illustrative embodiment according to one or more aspects of the disclosure.
Figure 2A:
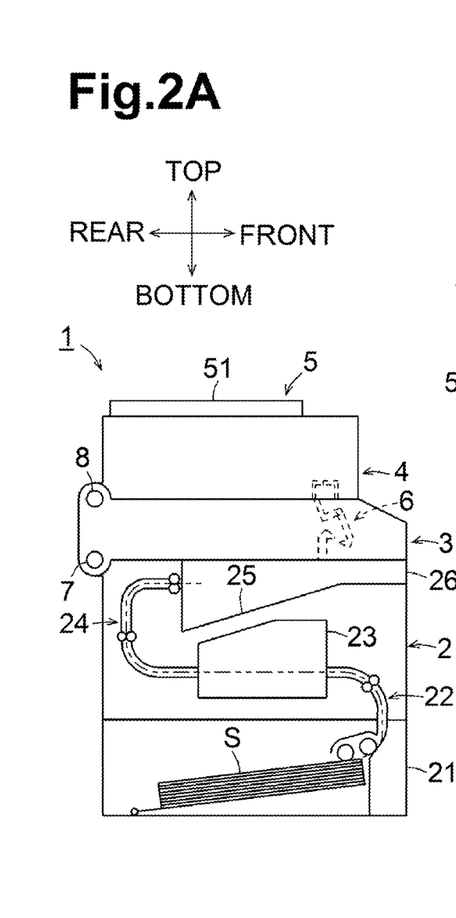
FIG. 2A is a schematic left side view of the image forming apparatus, illustrating a second casing and a document cover of the image forming apparatus are closed.
Figure 2B:
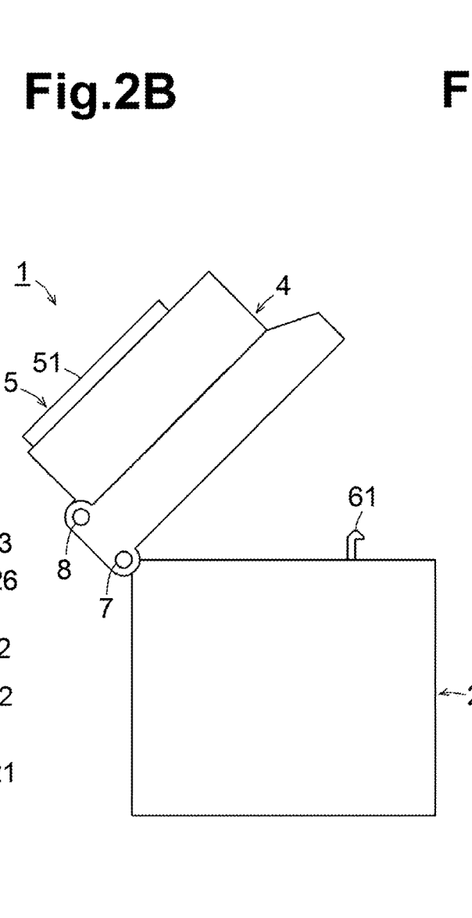
FIG. 2B is a schematic left side view of the image forming apparatus, illustrating the second casing is open.
Figure 2C:
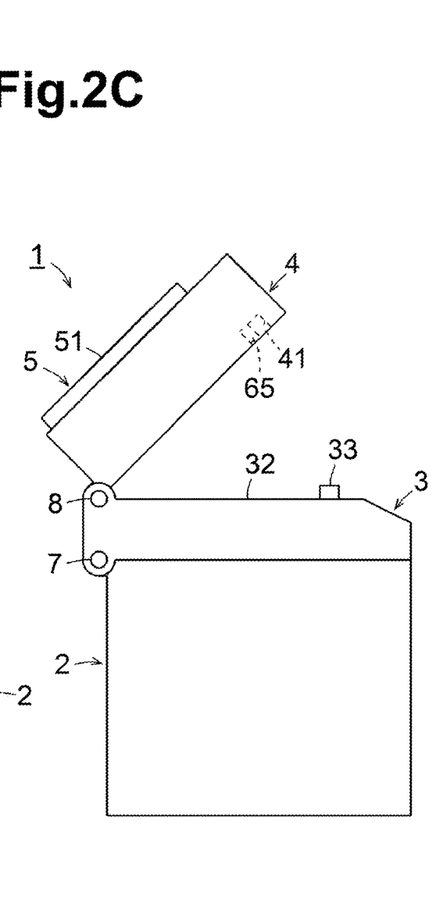
FIG. 2C is a schematic left side view of the image forming apparatus, illustrating the document cover is open.

FIG. 1 is a perspective view of an image forming apparatus 1 in an illustrative embodiment according to one or more aspects of the disclosure. FIGS. 2A-2C are schematic left side views of the image forming apparatus 1. FIG. 2A illustrates that a second casing 3 and a document cover 4 (described below) are closed. FIG. 2B illustrates that the second casing 3 is open. FIG. 2C illustrates that the document cover 4 is open. Although omitted in FIGS. 2B and 2C, some elements disposed in the image forming apparatus 1 are illustrated in FIG. 2A.

The image forming apparatus 1 includes a first casing 2, the second casing 3, the document cover 4, an automatic document feeder ("ADF") 5, and a lock mechanism 6.

The first casing 2 has a rectangular parallelepiped configuration. As depicted in FIG. 2A, the first casing 2 houses a sheet cassette 21, a conveying mechanism 22, an image forming unit 23, and a discharge mechanism 24. The sheet cassette 21 is configured to hold one or more sheets S. The conveying mechanism 22 is configured to convey the sheets S from the sheet cassette 2. The image forming unit 23 is configured to form images on the sheets S conveyed by the conveying mechanism 22. The discharge mechanism 24 is configured to convey the sheets S from the image forming unit 23 and discharge the sheets S out of the first casing 2. The image forming unit 23 may form an image based on, but not limited to, an electrophotographic method, an inkjet method, and a thermal head method.

The first casing 2 has a discharge tray 25 formed at an upper portion thereof. The discharge tray 25 is formed in an upper surface of the first casing 2 such that a bottom surface of the discharge tray 25 extends upwardly from the rear to the front. At a front portion of the first casing 2, a front opening 26 may be defined between the upper surface of the first casing 2 and a lower surface of the second casing 3. The discharge mechanism 24 is configured to discharge the sheets S having images formed thereon in a rear-to-front direction onto the discharge tray 25.

The second casing 3 has approximately the same projection area or "footprint" as an upper surface of the first casing 2. The term "footprint" of the second casing 3 refers to the area necessary for placing the second casing 3 on a floor or a table. The second casing 3 is disposed above the first casing 2, covering the upper surface of the first casing 2. The second casing 3 and the first casing 2 are connected together at their rear end portions, via a hinge 7 that has a pivot axis extending in the left-right direction. The second casing 3 is configured to pivot about the hinge 7 between a first position as depicted in FIG. 2A and a second position as depicted in FIG. 2B. The second casing 3 may be located at the first position where the second casing 3 covers the upper surface of the first casing 2. The second casing 3 may be located at the second position where the upper surface of the first casing 2 is revealed.

As depicted in FIG. 1, the second casing 3 includes an inclined control panel 31 disposed at an upper front portion thereof. The control panel 31 may include a touchscreen and/or physical buttons. As depicted in FIG. 2C, the second casing 3 further includes a document support surface 32 and a positioning column 33. When the second casing 3 is at the first position, an upper surface of the second casing 3 is the document support surface 32. The document support surface 32 is a surface of a transparent glass plate. The positioning column 33 protrudes upward relative to the document support surface 32. The second casing 3 houses an image scanner (not depicted) therein. The image scanner is configured to scan an image on a document that is placed on the document support surface 32.

The image scanner includes an image sensor, and a driving mechanism configured to move the image sensor. The image sensor may be, for example, a sensor array including a plurality of photodiodes arranged in the front-rear direction. The driving mechanism includes a motor and a plurality of gears, and is configured to move the image sensor in the left-right direction. The image sensor scans a document placed on the document support surface 32 while moving.

The document cover 4 has approximately the same projection area or "footprint" as the document support surface 32. The document cover 4 is disposed above the second casing 3, covering the upper surface of the second casing 3. The document cover 4 and the second casing 3 are connected together at their rear end portions via a hinge 8 that has a pivot axis extending parallel to the pivot axis of the hinge 7. The document cover 4 is configured to pivot about the hinge 8 between a third position as depicted in FIG. 2A and a fourth position as depicted in FIG. 2C. The document cover 4 may be located at the third position where the document cover 4 covers the document support surface 32. The document cover 4 may also be located at the fourth position where the document support surface 32 is revealed.

The document cover 4 has a function to keep a position of a document on the document support surface 32. The document cover 4 has a positioning recess 41, as depicted in FIG. 2C. The positioning recess 41 is formed into a lower surface of the document cover 4 when located at the third position as depicted in FIG. 2A, toward the upper side. When the document cover 4 is at the third position, the positioning column 33 of the second casing 3 fits in the positioning recess 41.

Figure 7A:
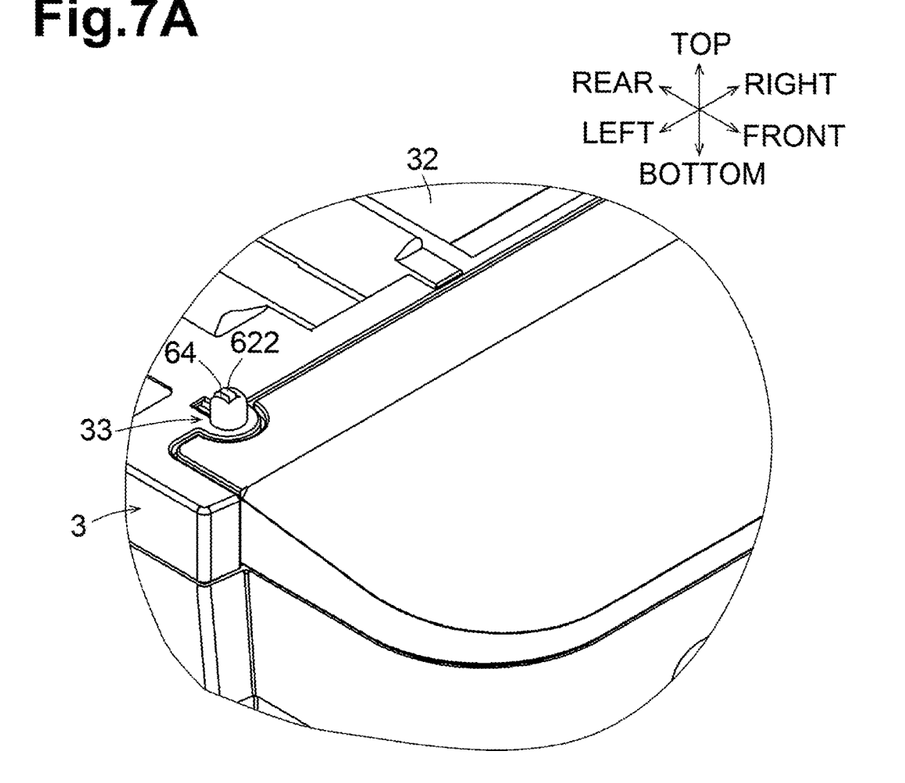
FIG. 7A is a perspective view of a positioning column and its surrounding components, in an illustrative embodiment according to one or more aspects of the disclosure, when the document cover is at a fourth position as depicted in FIG. 2C.

The positioning column 33 has a generally cylindrically-shaped body and a dome-shaped upper surface (best shown in FIG. 7A). For the simplicity of illustration, some drawings may depict the upper surface of the positioning column 33 as being flat. In another embodiment, the positioning column 33 may have a flat upper surface instead of the dome-shaped upper surface.

The positioning recess 41 is an elongated recess having a length in the front-rear direction, a width in the left-right direction, and a depth in the top-bottom direction. The length of the positioning recess 41 is greater than the diameter of the positioning column 33. The width of the positioning recess 41 is generally the same as the diameter of the positioning column 33. The depth of the positioning recess 41 is greater than the height of the positioning column 33.

The ADF 5 is located above the document cover 4. The ADF 5 includes a document feed tray 51 and a feed mechanism (not depicted). The feed mechanism is configured to feed a document placed on the document feed tray 51 over the image sensor, and to discharge the document to a document discharge tray 52 on an upper surface of the document cover 4. The ADF 5 may automatically feed each of a plurality of document pages. The image scanner scans an image on a respective one of the document pages fed by the ADF 5.

As depicted in FIG. 2A, the lock mechanism 6 is disposed at a front left portion of the image forming apparatus 1 (e.g., at the first casing 2, the second casing 3, and the document cover 4). Placing the document cover 4 at the fourth position as depicted in FIG. 2C causes the lock mechanism 6 to hold the second casing 3 relative to the first casing 2. Placing the document cover 4 at the third position as depicted in FIG. 2A causes the lock mechanism 6 to release the second casing 3 relative to the first casing 2.

A user of the image forming apparatus 1 may pivot the document cover 4 upward from the third position to the fourth position and then place a document on the document support surface 32. Placing the document cover 4 at the third position and placing the second casing 3 at the first position may allow the user to load a stack of document pages on the document feed tray 51 of the ADF 5. Each of the document pages on the document feed tray 51 may be automatically fed by the ADF 5 and scanned by the image scanner.

The user may pivot the second casing 3 upward to the second position. This pivoting action may provide easy access to the front opening 26 and the discharge tray 25. The user may readily access sheets, such as relatively small-sized sheets, discharged onto the discharge tray 25.

[Configuration of Lock Mechanism]

Figure 3:
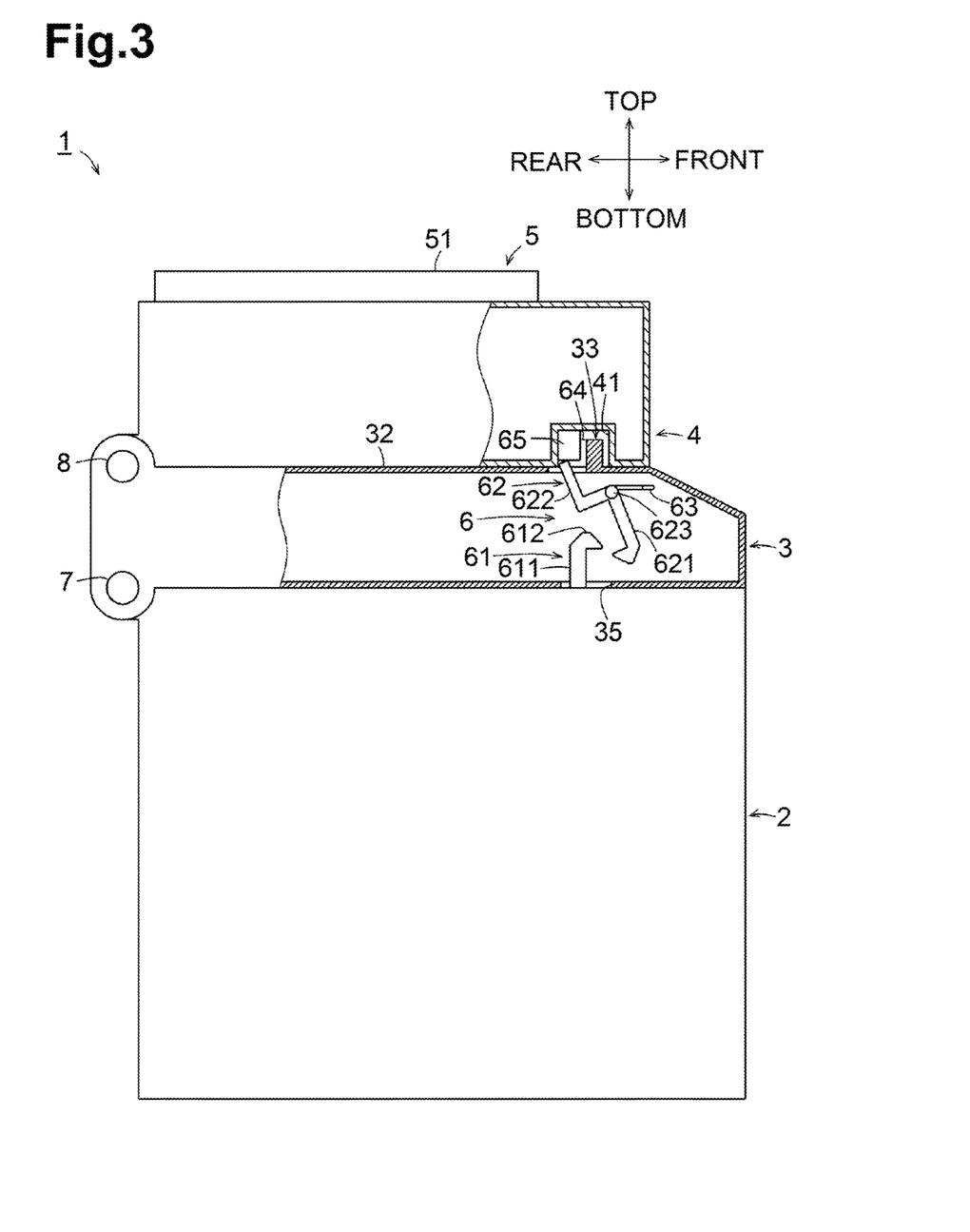
FIG. 3 is a partial sectional view of the image forming apparatus depicted in FIG. 2A.
Figure 4:
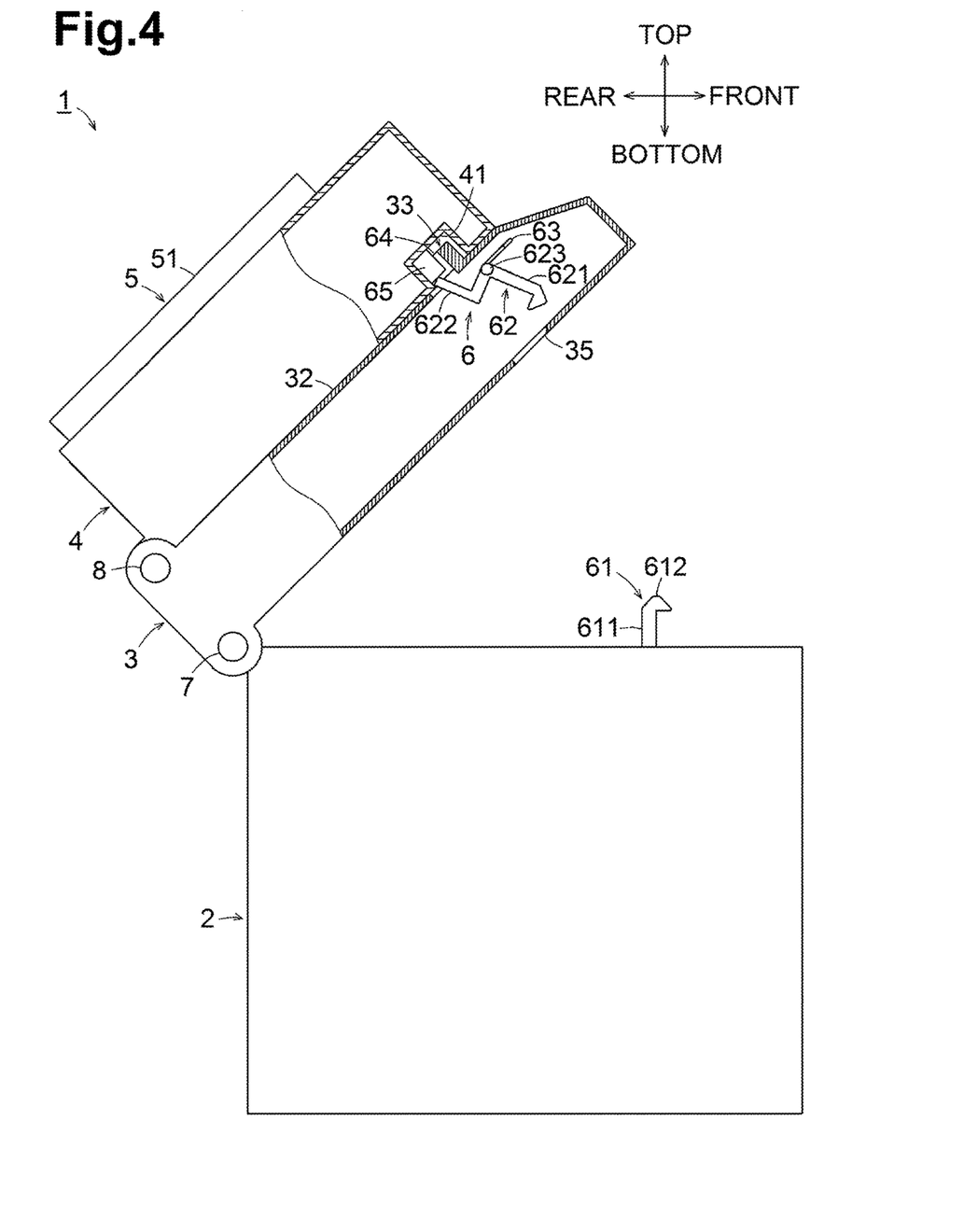
FIG. 4 is a partial sectional view of the image forming apparatus depicted in FIG. 2B.
Figure 5:
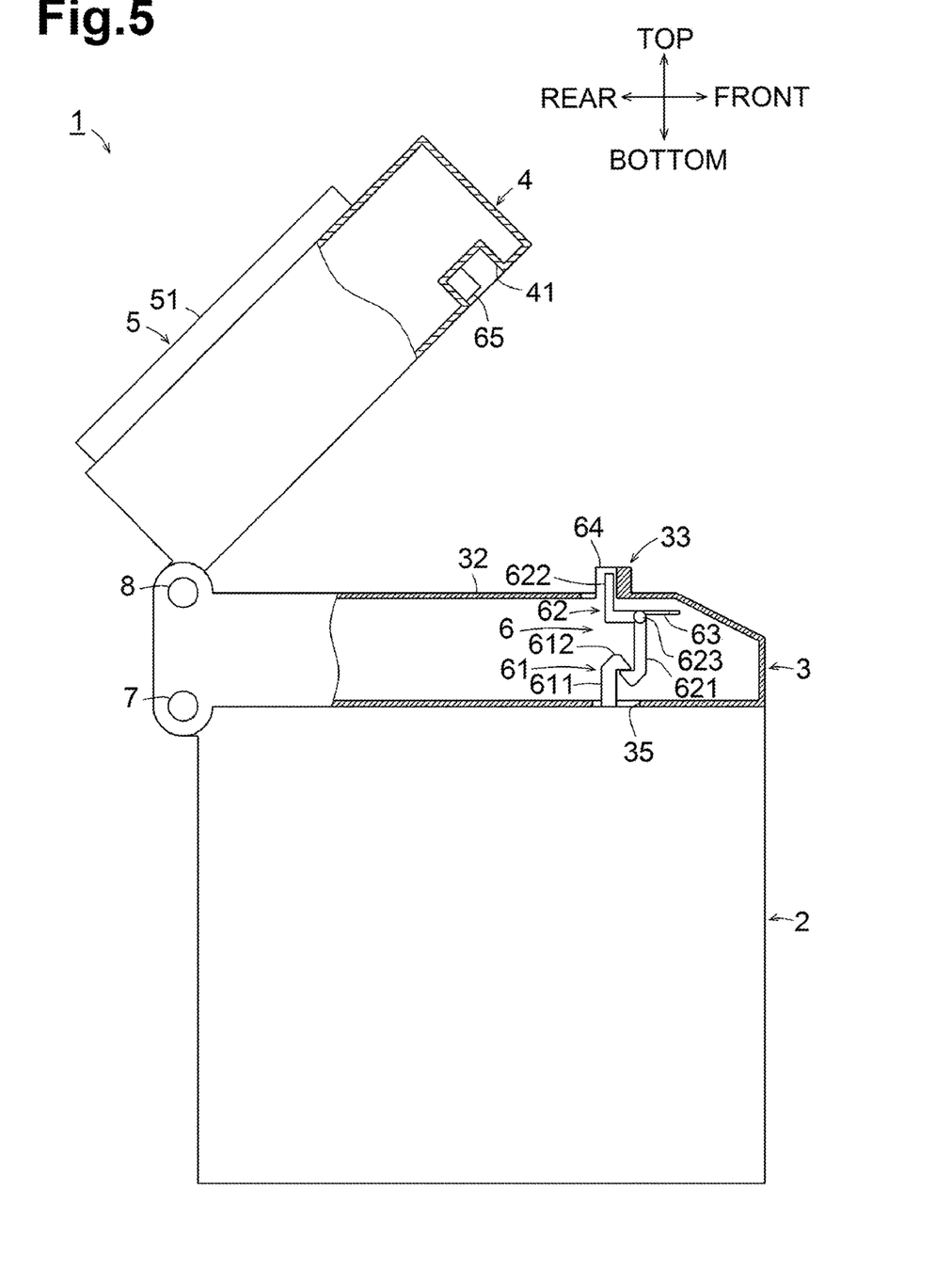
FIG. 5 is a partial sectional view of the image forming apparatus depicted in FIG. 2C.

FIG. 3 is a partial sectional view of the image forming apparatus 1 depicted in FIG. 2A. FIG. 4 is a partial sectional view of the image forming apparatus 1 depicted in FIG. 2B. FIG. 5 is a partial sectional view of the image forming apparatus 1 depicted in FIG. 2C. The lock mechanism 6 includes a fixed hook 61, a movable hook 62, a biasing member 63, a cutout portion 64, and an actuator 65.

As depicted in FIG. 3, the fixed hook 61 is located at the upper surface of the first casing 2. When the second casing 3 is at the first position, the fixed hook 61 is located below the positioning column 33. The fixed hook 61 is a generally L-shaped hook protruding upward relative to the upper surface of the first casing 2. The fixed hook 61 includes a bar-shaped base portion 611 and a hook portion 612. The base portion 611 extends upward relative to the upper surface of the first casing 2. The hook portion 612 protrudes frontward from an upper end of the base portion 611. The second casing 3 has an opening 35 at a lower surface thereof. When the second casing 3 is at the first position, the fixed hook 61 is located in the second casing 3 through the opening 35.

Figure 6:
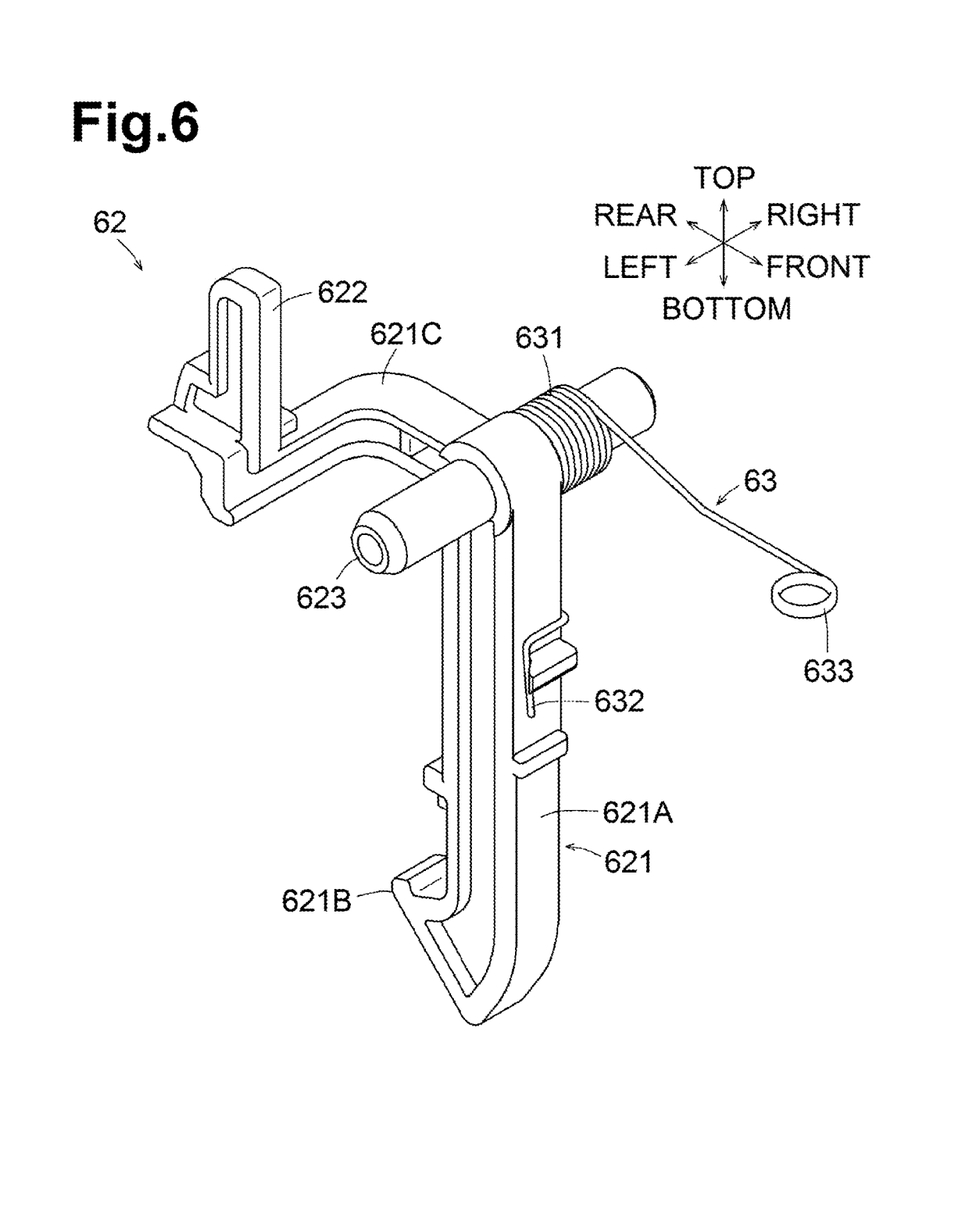
FIG. 6 is a perspective view of a movable hook in an illustrative embodiment according to one or more aspects of the disclosure.

The movable hook 62 is disposed in the second casing 3 between the positioning column 33 and the opening 35. The movable hook 62 is configured to move relative to the second casing 3 and engage with the fixed hook 61 in the vertical direction (e.g., top-bottom direction) such that the engagement restricts vertical movement of the fixed hook 61 and the movable hook 62. FIG. 6 is a perspective view of the movable hook 62. In FIG. 6, directional terms are labelled based on the movable hook 62 oriented as depicted in FIG. 5.

As depicted in FIG. 6, the movable hook 62 includes an engaging portion 621, a pressed portion 622, and a pivot shaft 623 that are integrally formed into a single piece. The engaging portion 621 includes a first base portion 621A, a hook portion 621B, and a second base portion 621C. The first base portion 621A is a bar-shaped portion extending vertically. The hook portion 621B protrudes rearward from a lower end of the first base portion 621A. The second base portion 621C extends rearward from an upper end of the first base portion 621A and bends leftward.

The pressed portion 622 is a bar-shaped portion extending upward from a left end of the second base portion 621C. The pivot shaft 623 is cylindrically shaped and extends from the upper end of the first base portion 621A in the left-right direction. The pivot shaft 623 is pivotally supported by the second casing 3. The movable hook 62 is configured to pivot about the pivot shaft 623 between an engaging position as depicted in FIG. 5, and a disengaging position as depicted in FIGS. 3 and 4. At the engaging position, the engaging portion 621 of the movable hook 62 is engaged with the fixed hook 61. At the disengaging position, the engaging portion 621 of the movable hook 62 is disengaged from the fixed hook 61.

The biasing member 63 is configured to bias the movable hook 62 toward the engaging position. In the illustrative embodiment, the biasing member 63 is, but not limited to be, a helical torsion spring. As depicted in FIG. 6, the biasing member 63 may include a coiled portion 631, one end 632, and an opposite end 633 opposite to the one end 632. The coiled portion 631 is around the pivot shaft 623. The one end 632 engages with the first base portion 621A. The opposite end 633 is fixed at the second casing 3.

The positioning column 33 has the cutout portion 64. The cutout portion 64 is a rearwardly open space with an open end facing rearward. The space allows communication with an interior of the second casing 3 in the vertical direction. The cutout portion 64 may have, for example, a right-angled "U" shape or a curved "U" shape, in plan view. For example, the right-angled "U" shape may be a shape of a rectangle whose one side is open. The curved "U" shape may be an arc shape. When the document cover 4 is at the fourth position, as depicted in FIG. 5, at least a part of the pressed portion 622 is located in the cutout portion 64 such that the upper end of the pressed portion 622 is at a level closer to the upper end of the cutout portion 64, e.g., the upper surface of the positioning column 33.

Figure 8:
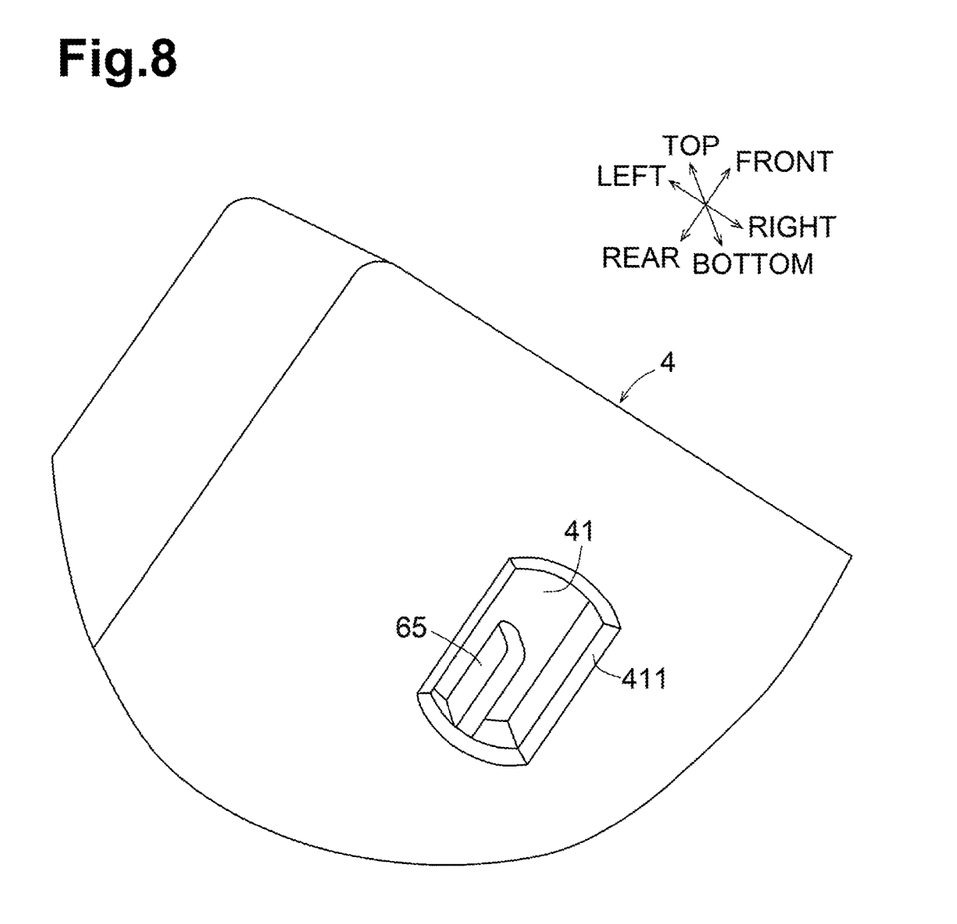
FIG. 8 is a perspective view of a positioning recess and its surrounding components in an illustrative embodiment according to one or more aspects of the disclosure.

As depicted in FIGS. 3, 5, and 8, the actuator 65 is disposed in the positioning recess 41. The actuator 65 is configured to push the pressed portion 622 when the document cover 4 is at the third position. FIG. 8 is a perspective view of the positioning recess 41 and its surrounding component. In FIG. 8, directional terms are labelled based on the document cover 4 oriented as depicted in FIG. 3.

The positioning recess 41 has an upper surface, a left surface, a right surface, a front surface, and a rear surface. As described above, the positioning recess 41 is an elongated recess having a length in the front-rear direction, a width in the left-right direction, and a depth in the top-bottom direction. The length of the positioning recess 41 is greater than the diameter of the positioning column 33. The width of the positioning recess 41 is generally equal to the diameter of the positioning column 33. The depth of the positioning recess 41 is greater than the height of the positioning column 33. When the document cover 4 is at the third position, the positioning column 33 is located in the positioning recess 41 such that each of left and right end portions of the positioning column 33 contacts a respective one of the left and right surfaces of the positioning recess 41, thereby positioning the document cover 4 relative to the second casing 3 in the left-right direction.

A portion of the lower surface of the document cover 4 near the border of the positioning recess 41 has a tapered surface 411. The tapered surface 411 helps to have the positioning column 33 readily guided into the positioning recess 41 during the movement of the document cover 4 from the fourth position to the third position.

The actuator 65 extends downward from the upper surface of the positioning recess 41 and protrudes frontward from the rear surface of the positioning recess 41. The actuator 65 is configured such that the actuator 65 is located in the cutout portion 64 in the positioning column 33 when the document cover 4 is at the third position. A lower end portion of the actuator 65 is located above the tapered surface 411. In other words, the entire actuator 65 is within the positioning recess 41. As the document cover 4 moves from the fourth position to the third position, the tapered surface 411 may first contact the positioning column 33, and then the actuator 65 may contact the pressed portion 622. This configuration may allow the actuator 65 to contact the pressed portion 622 first without interfering with the positioning column 33.

Figure 7B:
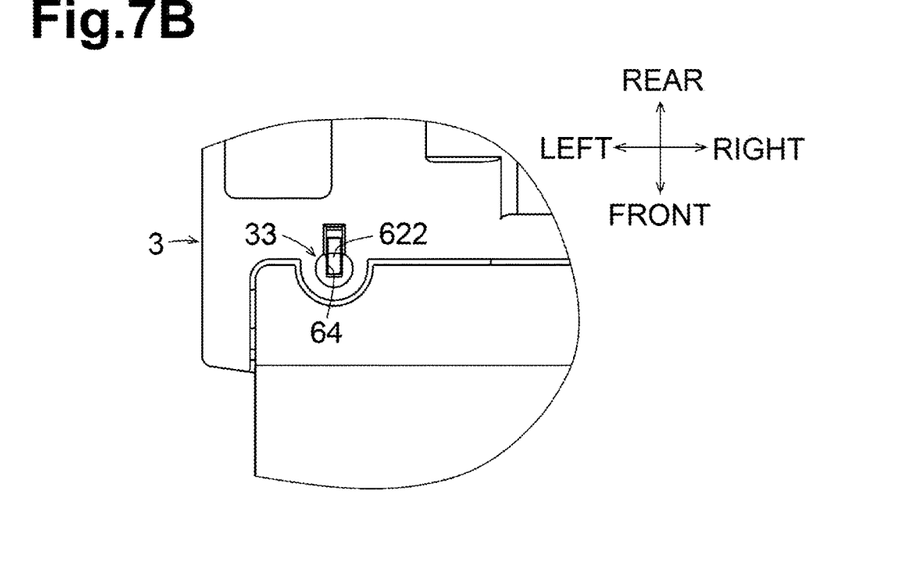
FIG. 7B is a plane view of the positioning column and its surrounding components when the document cover is at the fourth position as depicted in FIG. 2C.

As depicted in FIGS. 5 and 7, the pressed portion 622 is located in the cutout portion 64, which is formed in the positioning column 33, when the document cover 4 is open and at the fourth position. A user may not visually recognize that the pressed portion 622 is concealed within the positioning column 33 such that it appears to be a single element of the positioning column 33. This configuration may provide space saving benefits and better appearance at the same time. This configuration may not cause a user to access the pressed portion 622 located in the cutout portion 64 with his/her finger or by a document.

The positioning column 33 is located adjacent to the pressed portion 622. When a user pivots the document cover 4 from the fourth position to the third position, the positioning column 33 fits in the positioning recess 41, and the actuator 65 contacts and pushes the pressed portion 622, thereby pivoting the movable hook 62 counterclockwise about the pivot shaft 623, as depicted in FIG. 3. The engaging portion 621 of the movable hook 62 is thus disengaged from the hook portion 612 of the fixed hook 61.

The pivot shaft 623 of the movable hook 62 is disposed parallel to the pivot axis of the document cover 4. This configuration may allow the actuator 65 to push the pressed portion 622 of the movable hook 62 down reliably when the document cover 4 is closed, thereby pivoting the movable hook 62 smoothly.

The cutout portion 64 opens toward the rear side in which the pivot axis of the document cover 4 is disposed. The actuator 65 that moves in an arc during pivoting of the document cover 4 from the fourth position to the third position may push the pressed portion 622 down reliably without interfering with the positioning column 33.

Moving the actuator 65 away from the pressed portion 622 may cause the biasing member 63 to move the movable hook 62 from the disengaging position to the engaging position.

The lock mechanism 6 is not necessarily located at a front left portion of the image forming apparatus 1. The lock mechanism 6 located farther from the hinge 8 may provide better positioning accuracy of the positioning column 33 and the positioning recess 41.

[Operations of Lock Mechanism]

Referring to FIG. 3 through FIG. 5, operations of the lock mechanism 6 will now be described. As depicted in FIG. 3, when the second casing 3 is at the first position and the document cover 4 is at the third position, the positioning column 33 fits in the positioning recess 41, thereby positioning the document cover 4 relative to the second casing 3. The actuator 65 entered into the cutout portion 64 pushes the pressed portion 622 down, thereby pivoting the movable hook 62 against the biasing force of the biasing member 63. Accordingly, the movable hook 62 is located at the disengaging position in which the hook portion 621B of the movable hook 62 is disengaged from the hook portion 612 of the fixed hook 61.

When the second casing 3 is at the first position as depicted in FIG. 3, the movable hook 62 is at the disengaging position. In this state, lifting up a front portion of the second casing 3 may cause the second casing 3 together with the document cover 4 to pivot upward about the hinge 7 to the second position as depicted in FIG. 4. Then, pushing the front portion of the second casing 3 down may cause the second casing 3 together with the document cover 4 to pivot downward to the first position as depicted in FIG. 3.

When the second casing 3 is at the first position and the document cover 4 is at the third position as depicted in FIG. 3, lifting up a front portion of the document cover 4 may cause the document cover 4 to pivot upward about the hinge 8 toward the fourth position as depicted in FIG. 5. Pivoting the document cover 4 to the fourth position causes the positioning recess 41 to be released from the positioning column 33, and the actuator 65 to move out of the cutout portion 64 and away from the pressed portion 622. In response, the movable hook 62 may pivot, due to the biasing force of the biasing member 63, to the engaging position in which the hook portion 621B of the movable hook 62 is engaged with the hook portion 612 of the fixed hook 61. Those interactions result in the lock mechanism 6 holding the second casing 3, at the first position, relative to the first casing 2, so that the second casing 3 may not be raised or pivot. Then, the user may push down the front portion of the document cover 4 located at the fourth position as depicted in FIG. 5, so the document cover 4 pivots downward to the third position as depicted in FIG. 3.

When the document cover 4 is open (e.g., at the fourth position), the lock mechanism 6 holds the second casing 3, at the first position, relative to the first casing 2. This configuration may reduce such risks that the image forming apparatus 1 undesirably tips backwards due to weight imbalance, e.g., the center of gravity of the image forming apparatus 1 shifted backwards. In a configuration in which the document cover 4 includes the ADF 5 and is therefore relatively heavy, the lock mechanism 6 may effectively prevent or reduce the image forming apparatus 1 from tipping backward. When the document cover 4 is closed (e.g., at the third position), the lock mechanism 6 releases the second casing 3 and allows the second casing 3 to pivot.

[Modifications]

In the illustrative embodiment, the image forming apparatus 1 includes the ADF 5. In another embodiment, an image forming apparatus does not necessarily include the ADF 5.

The image forming apparatus may be without the biasing member 63 if the movable hook 62 is designed or the center of gravity of the hook 62 is determined such that the movable hook 62 is configured to pivot to the engaging position, as depicted in FIG. 5, by its own weight.

In another embodiment, the engaging portion 621 and the pressed portion 622 may be separate elements that move in association with each other. In this configuration, a lower end of the pressed portion 622 contacts an upper surface of a left end portion of the second base portion 621C of the engaging portion 621. In response to the actuator 65 pushing the pressed portion 622 down, the second base portion 621C of the engaging portion 621, which moves in association with the pressed portion 622, is also pressed down, thereby pivoting the engaging portion 621 about the pivot shaft 623. In contrast, the engaging portion 621 pivoted with the biasing force of the biasing member 63 may cause the second base portion 621C to raise the pressed portion 622.

To summarize aspects of the illustrative embodiment and the modifications, the engaging portion 621 is disposed in the second casing 3 and is configured to engage with the fixed hook 61 in the vertical direction. The engaging portion 621 is configured to pivot about a pivot axis parallel to, for example, the pivot axis of the hinge 8 for the document cover 4. The pressed portion 622 is configured to move together with or in association with the engaging portion 621. The pressed portion 622 is at least partially located in the cutout portion 64. The pressed portion 622 and the engaging portion 621 may be separately formed and be arranged to contact with each other, thereby moving the pressed portion 622 and the engaging portion 621 in association with each other.

As described above, when the document cover 4 is open, the lock mechanism 6 holds the second casing 3 to prevent the image forming apparatus 1 from tipping backward. When the document cover 4 is closed, the lock mechanism 6 releases the second casing 3 to allow the second casing 3 to pivot. The pressed portion 622 received in the cutout portion 64 in the positioning column 33 appears to be a single element integrally formed with the positioning column 33. This configuration may provide space saving benefits and better appearance at the same time. The cutout portion 64 may help to prevent the pressed portion 622 from being pressed by a user with his/her finger or by a document. When the document cover 4 is closed, the positioning column 33 fits in the positioning recess 41, and the actuator 65 pushes the pressed portion 622 down. The engaging portion 621 that moves together with or in association with the pressed portion 622 may readily disengage from the fixed hook 61.

The image forming apparatus 1 according to the illustrative embodiment includes the ADF 5, which adds its weight to the document cover 4. The lock mechanism 6 may effectively prevent the image forming apparatus 1 from tipping backward.

The image forming apparatus 1 according to the illustrative embodiment includes the engaging portion 621 whose pivot axis is parallel to the pivot axis of the document cover 4. Accordingly, as the document cover 4 closes, the actuator 65 may properly push the pressed portion 622 down, thereby smoothly pivoting the engaging portion 621.

The engaging portion 621 and the pressed portion 622 are integrally formed into a single piece, which reduces the number of components to be used in the image forming apparatus 1.

The image forming apparatus 1 according to the illustrative embodiment includes the biasing member 63 configured to, when the actuator 65 moves out of contact with the pressed portion 622, bias the engaging portion 621 from the disengaging position toward the engaging position.

The image forming apparatus 1 according to the illustrative embodiment includes the positioning column 33 whose dimension in the left-right direction (or a direction in which the pivot axis of the document cover 4 extends) is equal to the dimension of the positioning recess 41 in the left-right direction.

This configuration may properly position the document cover 4 relative to the second casing 3 in the direction in which the pivot axis of the document cover 4 extends.

The image forming apparatus 1 according to the illustrative embodiment includes the positioning column 33 that is cylindrically shaped. The cutout portion 64 is open toward the pivot axis of the document cover 4.

The cutout portion 64 is open toward the pivot axis of the document cover 4, so that, as the document cover 4 closes, the actuator 65 may contact the pressed portion 622 without interfering with the positioning column 33.

What is claimed is:
1. An image forming apparatus, comprising:
an image forming unit;
a first casing that houses the image forming unit therein;
a second casing;
a document cover; and
a lock mechanism;
wherein the second casing comprises:
   a document support surface located at an upper surface of the second casing; and
   a positioning column protruding upward relative to the document support surface,
wherein the second casing is connected to the first casing, disposed above the first casing, and configured to pivot between a first position in which the second casing covers an upper surface of the first casing, and a second position in which the second casing reveals the upper surface of the first casing,
wherein the document cover is connected to the second casing, disposed above the second casing, and configured to pivot between a third position in which the document cover covers the document support surface, and a fourth position in which the document cover reveals the document support surface,
wherein the document cover has a positioning recess, in which the positioning column of the second casing fits when the document cover is at the third position,
wherein the lock mechanism comprises:
   a fixed hook disposed at the first casing;
   a movable hook disposed in the second casing;
   a pressed portion configured to move in association with the movable hook; and
   an actuator disposed in the positioning recess;
wherein the positioning column has a cutout portion configured to receive the pressed portion,
wherein when the second casing is at the first position and the document cover is at the fourth position, the pressed portion is located in the cutout portion and the movable hook is engaged with the fixed hook, and
wherein when the second casing is at the first position and the document cover is at the third position, the positioning column fits in the positioning recess, and the actuator contacts the pressed portion, thereby disengaging the movable hook from the fixed hook.

2. The image forming apparatus according to claim 1, wherein the document cover includes an automatic document feeder.

3. The image forming apparatus according to claim 1, wherein the movable hook is configured to pivot about an axis parallel to another axis, about which the second casing pivots.

4. The image forming apparatus according to claim 1, wherein the pressed portion is integral with the movable hook.

5. The image forming apparatus according to claim 1, further comprising a biasing member configured to bias the movable hook,
   wherein when the biasing member biases the movable hook, the movable hook is engaged with the fixed hook.

6. The image forming apparatus according to claim 1, wherein a dimension of the positioning column in a direction in which an axis extends is equal to a dimension of the positioning recess in the direction in which the axis extends, and wherein the document cover is configured to pivot about the axis.

7. The image forming apparatus according to claim 1, wherein the positioning column is cylindrical and the cutout portion is open toward an axis, and wherein the document cover is configured to pivot about the axis.

* * * * *